Patented Apr. 7, 1931

1,800,120

UNITED STATES PATENT OFFICE

FERNANDO SOMOZA VIVAS, OF LOS ANGELES, CALIFORNIA, ASSIGNOR TO INTERNATIONAL FIREPROOF PRODUCTS CORPORATION, OF NEW YORK, N. Y., A CORPORATION OF DELAWARE

NONEXPLOSIVE FIRE-RESISTING LACQUER AND PROCESS OF PRODUCING SAME

No Drawing. Application filed March 11, 1927. Serial No. 174,639.

The invention relates to lacquers and has as an object the provision of a lacquer which is non-explosive and fire resisting.

A further object of the invention is the provision of a process for producing such a lacquer of good quality as to appearance and durability without danger of explosion during its manufacture.

It is a further object of the invention to produce such a lacquer by means of a cheap commercial process.

In its preferred form the lacquer comprises the following ingredients:

Gum dammar or manila copal, half second soluble cotton, castor oil, dehydrated calcium chloride, crystallized boric acid, butyl alcohol, denatured alcohol, butyl acetate, ethyl acetate, toluol, perchlormethane or chlorinated hydrocarbon.

The process is carried out in the following manner:

The gum, preferably pulverized, is placed in a shellac cutter with the butyl alcohol and the denatured alcohol in a proportion of about 45 parts of gum to 25 parts of the alcohols, the alcohol being made of substantially one part of butyl and two parts of denatured alcohol. The gum is thoroughly dissolved in the alcohol by means of the shellac cutter to produce a syrup-like mass to which solution boric acid is added in the quantity of one-half pound to a gallon of the solution, which boric acid is then thoroughly dissolved and incorporated into the solution by agitation.

There is then added to the solution an equal weight of perchlormethane which is thoroughly incorporated therewith. This compound will be hereinafter referred to as the "gum solution".

Twenty-four pounds of first class, one-half second soluble cotton is placed in a shellac cutter with four gallons of high grade toluol which is allowed to impregnate for substantially one hour and is then agitated, after which four gallons of butyl acetate and four gallons of perchlormethane are added and thoroughly incorporated therewith. This solution will be hereinafter referred to as the "cotton solution".

One-half pound of dehydrated calcium chloride is mixed with one pound of denatured alcohol and when dissolved is filtered and the filtered solution is mixed with eight ounces of heavy boiled castor oil. When perfectly mixed add to the oil solution two pounds of perchlormethane, four ounces of pure toluol, three ounces of butyl acetate, and four ounces of ethyl acetate.

More alcohol and perchlormethane may be used to bring the solution to a consistency of 45 per cent solids and oil, and 55 per cent solvents and the material is thoroughly incorporated by agitation.

To produce a lacquer take of the gum solution one-half pound, of the cotton solution two pounds, and of the oil solution one-half pound and add thereto a mixture of one-third alcohol and two-thirds perchlormethane to produce a gallon of lacquer.

After the lacquer has been brought to a condition of perfect solution as by agitation in a shellac cutter, the product is stored and allowed to settle or is passed through a filter press when it is ready for use.

Instead of perchlormethane in the formula a chlorinated hydrocarbon may be used such as that prepared by a process of producing a non-combustible chlorinated hydrocarbon described in either of my Patents Nos. 1,733,842, or 1,733,843, dated October 29, 1929.

The term "chlorinated hydrocarbon" in the claims is intended to disignate perchlormethane in which all the hydrogen of a hydrocarbon has been replaced by chlorine or other noncombustible material in which a portion only of the hydrogen has been replaced by chlorine, including the substance prepared according to the method of my above referred to application for patent.

Minor changes may be made in the proportions of the substances named or in the steps of the process within the scope of the appended claims without departing from the spirit of the invention.

I claim:

1. The process of producing a lacquer which comprises dissolving gum in alcohol and adding boric acid and perchlormethane to produce a gum solution, impregnating soluble cotton with toluol and adding butyl acetate and perchlormethane to produce a soluble cotton solution, dissolving calcium chloride in alcohol and adding perchlormethane, toluol, castor oil, butyl and ethyl acetates thereto to produce an oil solution and combining said gum, soluble cotton and oil solutions in proportions to produce a non-inflammable, non-explosive lacquer.

2. The process of producing a lacquer which comprises the following steps of combining the named materials in substantially the recited proportions, namely, dissolving forty-five parts of gum dammar in eight parts of denatured alcohol and seventeen parts of butyl alcohol and incorporating one-half pound of boric acid to the gallon of the solution and combining the solution with an equal weight of perchlormethane to provide a gum solution, impregnating twenty-four pounds of soluble cotton with four gallons of perchlormethan and adding four gallons of butyl acetate and four gallons of perchlormethane to provide a cotton solution, dissolving one-half pound calcium chloride in one pound of denatured alcohol and adding eight ounces of boiled castor oil, two pounds of perchlormethane, four ounces of toluol, three ounces of butyl acetate and four ounces of ethyl acetate to produce an oil solution, combining one-half gallon of the gum solution, two pounds of the cotton solution and one-half pound of the oil solution with a mixture of one-third alcohol and two-thirds perchlormethane to produce one gallon of lacquer.

3. The process of producing a non-explosive, non-inflammable lacquer which comprises diluting an alcoholic solution of gum dammar with perchlormethane, dissolving soluble cotton impregnated with perchlormethane in butyl acetate, dissolving calcium chloride in alcohol and adding a drying oil, perchlormethane, toluol and butyl and ethyl acetates, combining suitable proportions of the so prepared gum, cotton and oil solutions to provide a lacquer.

4. The process of producing a non-explosive, non-inflammable lacquer which comprises diluting an alcoholic solution of gum dammar with perchlormethane, dissolving soluble cotton impregnated with perchlormethane in butyl acetate, dissolvng calcium chloride in alcohol and adding a drying oil, perchlormethane, toluol and butyl and ethyl acetates, combining suitable proportions of the so prepared gum, cotton and oil solutions with a mixture of alcohol and perchlormethane in suitable proportions to provide a lacquer.

5. A non-explosive, non-inflammable lacquer comprising gum dammar, soluble cotton, a drying oil, calcium chloride, boric acid, alcohol, butyl acetate, ethyl acetate, toluol and perchlormethane combined in proportions to produce a lacquer.

In testimony whereof I affix my signature.

FERNANDO SOMOZA VIVAS.